United States Patent
Huang et al.

(10) Patent No.: US 10,128,055 B1
(45) Date of Patent: Nov. 13, 2018

(54) ELECTROLYTIC CAPACITOR

(71) Applicant: Lelon Electronics Corp., Taichung (TW)

(72) Inventors: Chen-Feng Huang, Taichung (TW); Chung-Ming Wu, Taichung (TW)

(73) Assignee: Lelon Electronics Corp., Taichung (TW)

( * ) Notice: Subject to any disclaimer, the term of this patent is extended or adjusted under 35 U.S.C. 154(b) by 0 days.

(21) Appl. No.: 15/663,868

(22) Filed: Jul. 31, 2017

(51) Int. Cl.
 *H01G 9/10* (2006.01)
 *H01G 9/145* (2006.01)

(52) U.S. Cl.
 CPC .................................. *H01G 9/145* (2013.01)

(58) Field of Classification Search
 CPC ................................. H01G 9/12; H01G 9/08
 USPC .................................................. 361/517–519
 See application file for complete search history.

(56) References Cited

U.S. PATENT DOCUMENTS

| | | | | |
|---|---|---|---|---|
| 2,199,519 A * | 5/1940 | Collins | ...................... | H01G 9/12 220/203.08 |
| 3,354,359 A | 11/1967 | Ford | | |
| 2006/0168787 A1* | 8/2006 | Will | ......................... | H01G 9/06 29/25.03 |
| 2010/0033900 A1* | 2/2010 | Miura | ..................... | H01G 9/016 361/502 |
| 2010/0149728 A1* | 6/2010 | Shimizu | ................... | H01G 9/12 361/519 |

\* cited by examiner

*Primary Examiner* — Eric Thomas
(74) *Attorney, Agent, or Firm* — Alan D. Kamrath; Kamrath IP Lawfirm, P.A.

(57) ABSTRACT

An electrolytic capacitor includes a body having a casing and a capacitor core. The casing includes a side having an opening intercommunicated with a receiving space of the casing in which the capacitor core is mounted. The sealing cover is mounted in the opening and includes a lid and an enveloping member. The lid includes a first side adjacent to the capacitor core, a second side, and an outer periphery extending between the first side and the second side of the lid. The enveloping member is securely engaged with the lid by insert molding. The enveloping member is engaged with the first side, the second side, and the outer periphery of the lid.

9 Claims, 7 Drawing Sheets

ELECTROLYTIC CAPACITOR

BACKGROUND OF THE INVENTION

The present invention relates to a capacitor and, more particularly, to an electrolytic capacitor.

U.S. Pat. No. 3,354,359 discloses an electrolytic capacitor with a compressed seal closing an open end of a cylindrical housing of the electrolytic capacitor. The seal includes a metallic insert and a rubber annulus enveloping an outer periphery of the metal insert. The seal avoids gaps in the open end of the cylindrical housing to prevent fluid leakage of the electrolytic capacitor.

However, when the electrolytic capacitor of the above structure is used in a frequently and vigorously vibrating environment, the coupling strength between the metallic insert and the rubber annulus may be reduced due to vibrations, eventually causing gaps between the metallic insert and the rubber annulus and leading to fluid leakage.

Thus, a need exists for a novel electrolytic capacitor that mitigates and/or obviates the above disadvantages.

BRIEF SUMMARY OF THE INVENTION

An electrolytic capacitor according to the present invention includes a body and a sealing cover. The body includes a casing and a capacitor core. The casing includes a receiving space. The casing further includes a side having an opening intercommunicated with the receiving space. The capacitor core is mounted in the receiving space. The sealing cover is mounted in the opening of the body. The sealing cover includes a lid and an enveloping member. The lid includes a first side adjacent to the capacitor core and a second side opposite to the first side. The lid further includes an outer periphery extending between the first side and the second side of the lid. The enveloping member is securely engaged with the lid by insert molding. The enveloping member is engaged with the first side, the second side, and the outer periphery of the lid.

In an example, the first side of the lid includes a first groove. The second side of the lid includes a second groove. A first protrusion protrudes from a first side of the enveloping member adjacent to the first side of the lid and is received in the first groove. A second protrusion protrudes from a second side of the enveloping member adjacent to the second side of the lid and is received in the second groove.

In an example, the lid further includes at least one third groove defined in the outer periphery. The at least one third groove intercommunicates with the first groove and the second groove. At least one third protrusion protrudes from a side of the enveloping member adjacent to the outer periphery of the lid. The at least one third protrusion is received in the at least one third groove. The at least one third protrusion is connected to the first protrusion and the second protrusion.

In an example, the at least one third groove includes an end extending to the first side of the lid. The at least one third groove further includes another end extending to the second side of the lid.

In an example, the first groove is annular and is adjacent to the outer periphery of the lid. A spacing between the first groove and the outer periphery in the radial direction is constant throughout a length of the first groove in a circumferential direction perpendicular to the radial direction. The second groove is annular and is adjacent to the outer periphery of the lid. A spacing between the second groove and the outer periphery of the lid in the radial direction is constant throughout a length of the second groove in the circumferential direction.

In an example, the casing further includes a first neck and a second neck at the opening. The sealing cover is located between the first neck and the second neck. The first neck abuts the second side of enveloping member. The second neck abuts the first side of the enveloping member. A width of each of the first neck and the second neck in the radial direction is smaller than a width of the enveloping member in the radial direction.

In an example, the width of each of the first neck and the second neck in the radial direction is smaller than a width of the lid in the radial direction.

In an example, the outer periphery of the lid is ring-shaped.

In an example, the at least one third groove includes six third grooves equispacedly disposed in the outer periphery of the lid. The six third grooves are intercommunicated with the first groove and the second groove. An end of each of the six third grooves extends to the first side of the lid. The other end of each of the six third grooves extends to the second side of the lid. The at least one third protrusion includes six third protrusions respectively received in the six third grooves. Each of the six third protrusions is connected to the first protrusion and the second protrusion.

In another example, the at least one third groove includes three third grooves equispacedly disposed in the outer periphery of the lid. The three third grooves are intercommunicated with the first groove and the second groove. An end of each of the three third grooves extends to the first side of the lid. The other end of each of the three third grooves extends to the second side of the lid. The at least one third protrusion includes three third protrusions respectively received in the three third grooves. Each of the three third protrusions is connected to the first protrusion and the second protrusion.

The present invention will become clearer in light of the following detailed description of illustrative embodiments of this invention described in connection with the drawings.

DETAILED DESCRIPTION OF THE INVENTION

Figure 1:
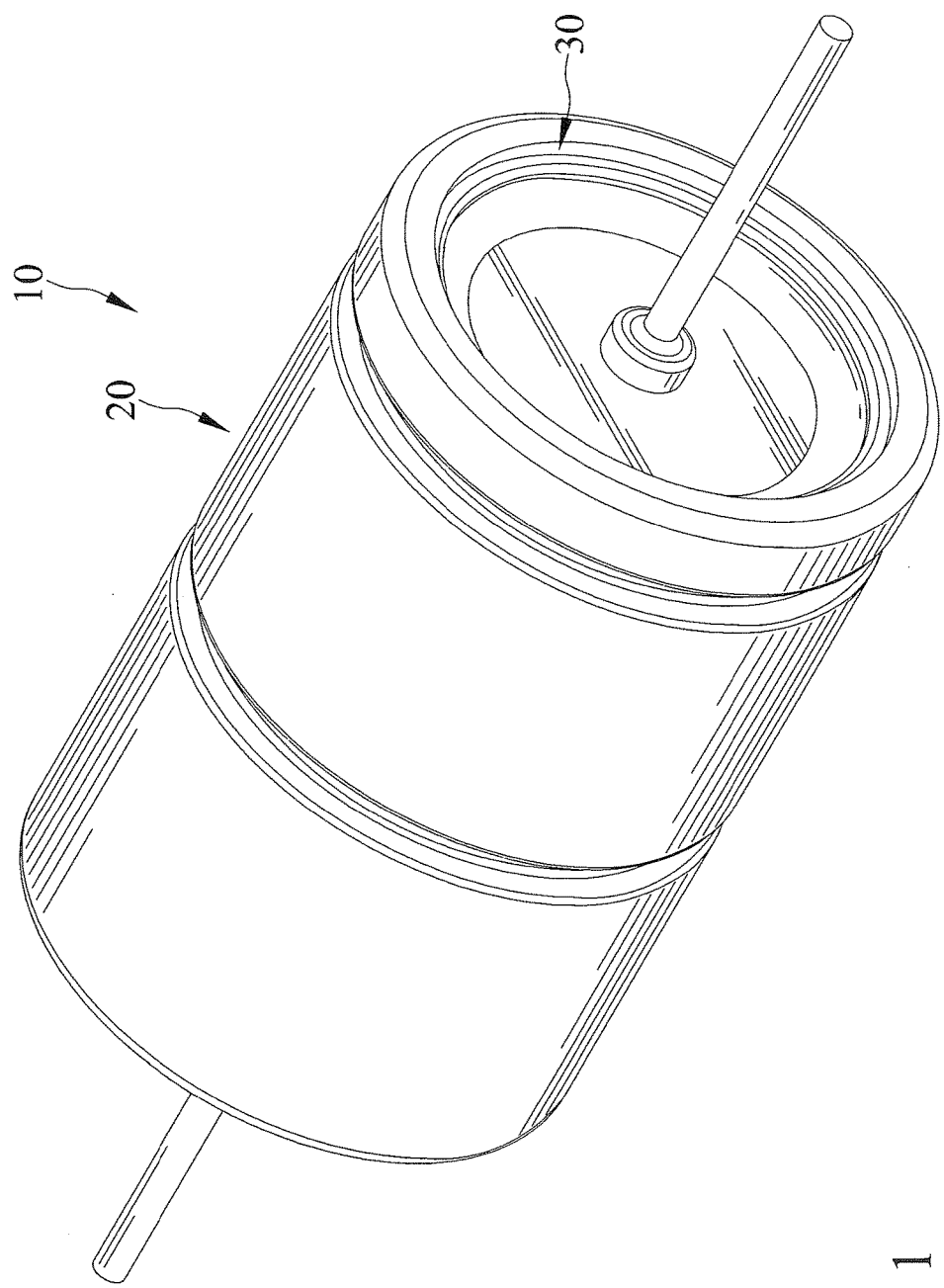
FIG. 1 is a perspective view of an electrolytic capacitor of a first embodiment according to the present invention.
Figure 2:
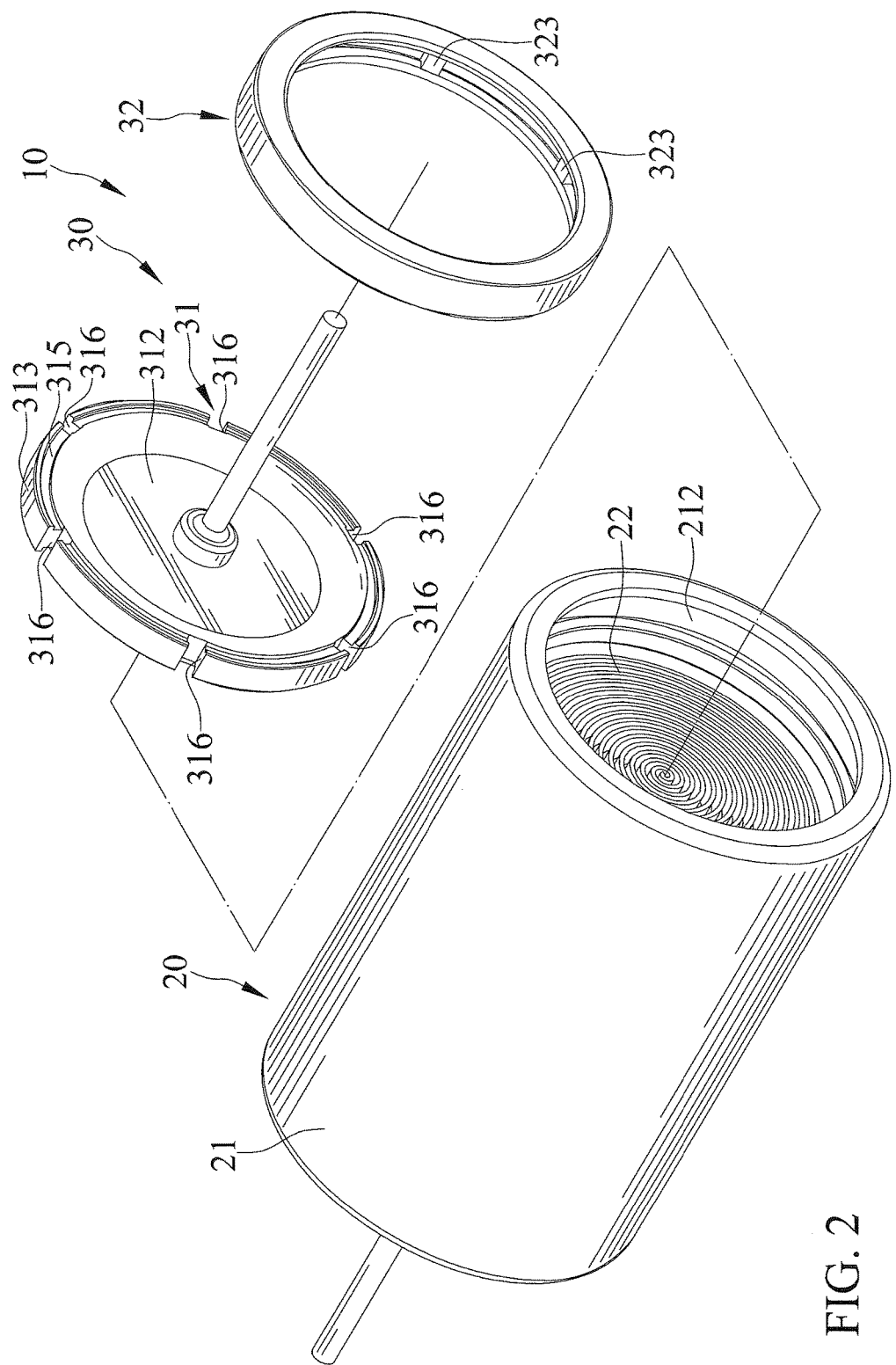
FIG. 2 is an exploded, perspective view of the electrolytic capacitor of FIG. 1.
Figure 3:
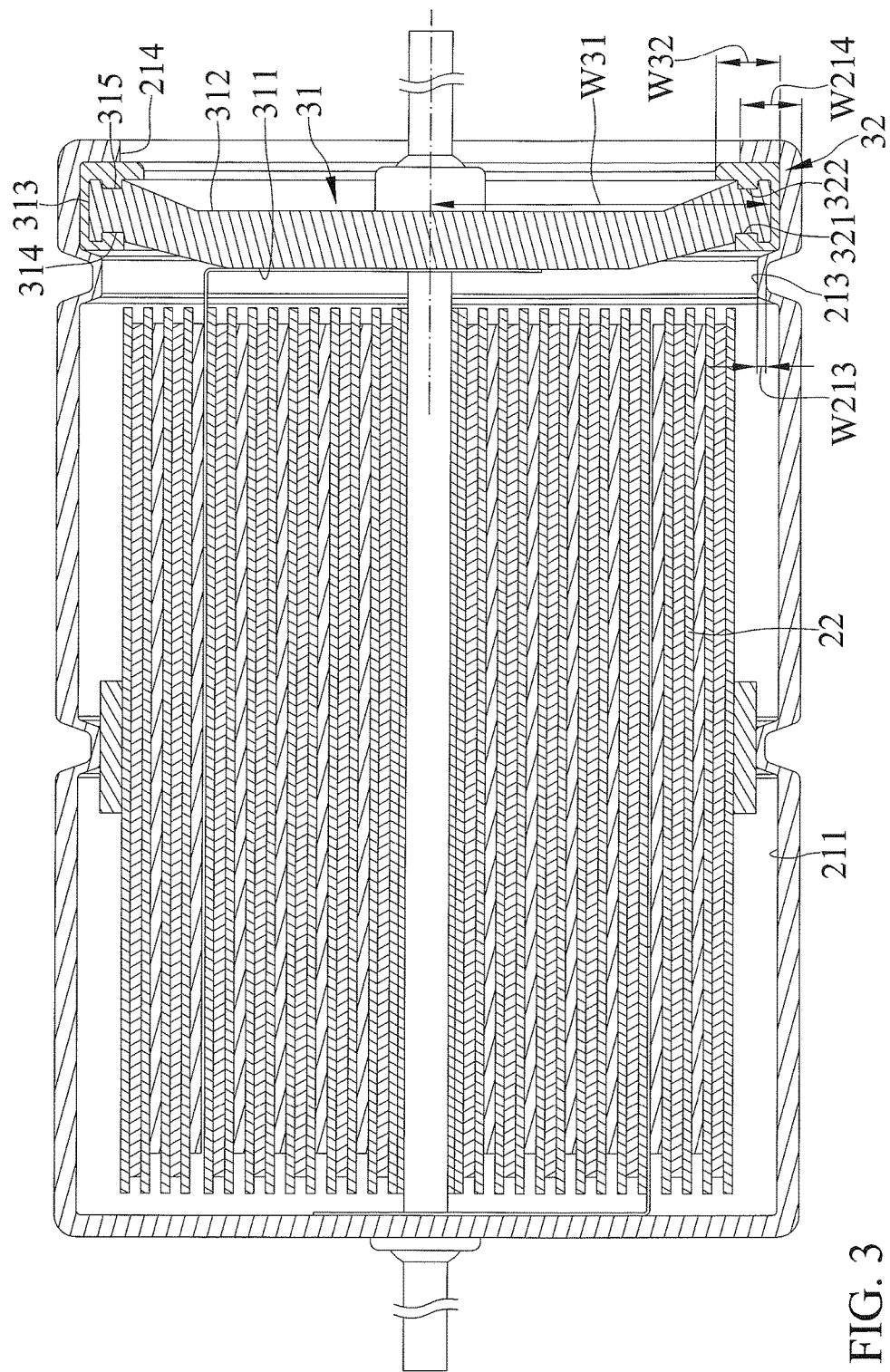
FIG. 3 is a cross sectional view of the electrolytic capacitor of FIG. 1.
Figure 4:
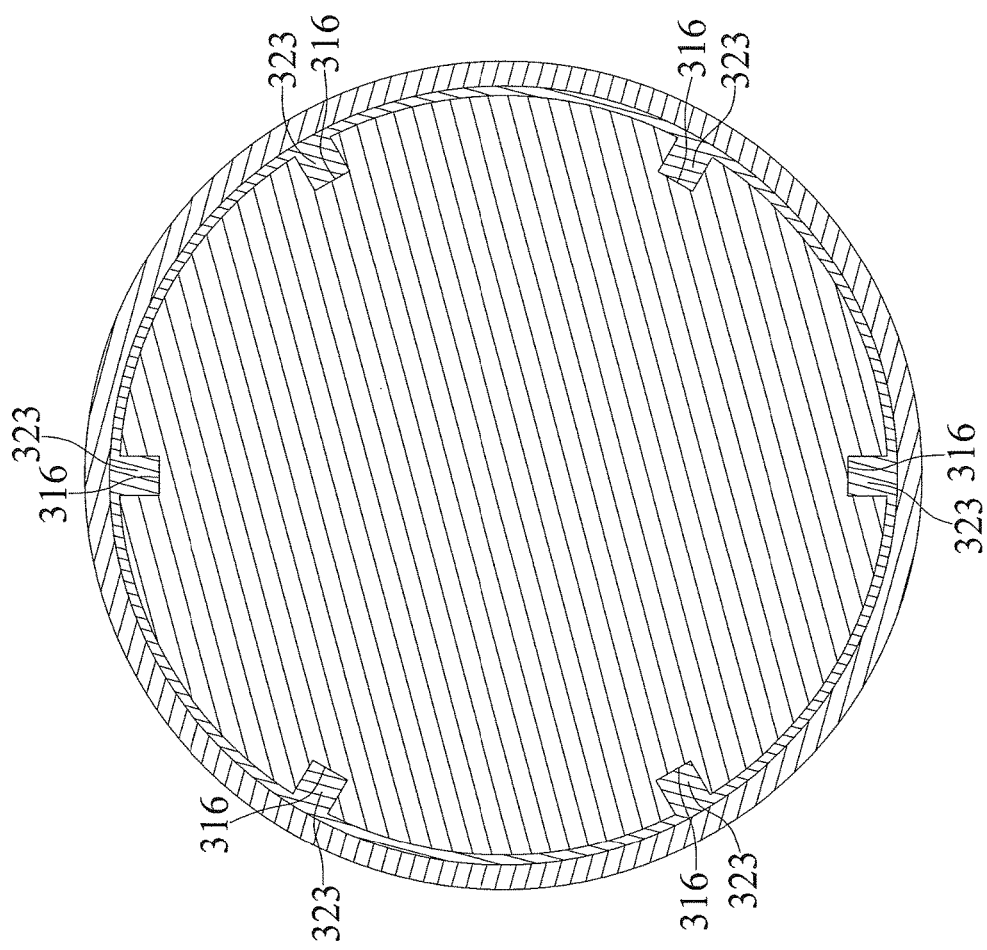
FIG. 4 is another cross sectional view of the electrolytic capacitor of FIG. 1.

With reference to FIGS. 1-4, an electrolytic capacitor 10 of a first embodiment according to the present invention includes a body 20 and a sealing cover 30.

The body 20 includes a casing 21 and a capacitor core 22. The casing 21 includes a receiving space 211. The casing 21 further includes a side having an opening 212 intercommunicated with the receiving space 211. The casing 21 further includes a first neck 213 and a second neck 214 at the opening 212. The capacitor core 22 is mounted in the receiving space 211.

The sealing cover 30 is mounted in the opening 212 of the body 20. The sealing cover 30 is located between the first neck 213 and the second neck 214. The sealing cover 30 includes a lid 31 and an enveloping member 32. The lid 31 is made of metal. The lid 31 includes a first side 311 adjacent to the capacitor core 22 and a second side 312 opposite to the first side 311. The lid 31 further includes an outer periphery 313 extending between the first side 311 and the second side 312. The outer periphery 313 of the lid 31 is ring-shaped.

The first side 311 of the lid 31 includes a first groove 314. The first groove 314 is annular and is adjacent to the outer periphery 313 of the lid 31. A spacing between the first groove 314 and the outer periphery 313 in the radial direction is constant throughout a length of the first groove 314 in a circumferential direction perpendicular to the radial direction. The second side 312 of the lid 31 includes a second groove 315. The second groove 315 is annular and is adjacent to the outer periphery 313 of the lid 31. A spacing between the second groove 315 and the outer periphery 313 of the lid 31 in the radial direction is constant throughout a length of the second groove 315 in the circumferential direction. The lid 31 includes at least one third groove 316 defined in the outer periphery 313. The at least one third groove 316 intercommunicates with the first groove 314 and the second groove 315. The at least one third groove 316 includes an end extending to the first side 311 of the lid 31 and another end extending to the second side 312 of the lid 31.

The enveloping member 32 is made of rubber and is securely engaged with the lid 31 by insert molding. The enveloping member 32 is engaged with the first side 311, the second side 312, and the outer periphery 313 of the lid 31. The first neck 213 abuts a second side of the enveloping member 32 opposite to the first side 311 of the lid 31. The second neck 214 abuts a first side of the enveloping member 32 opposite to the second side 312 of the lid 31. A width W213, W214 of each of the first neck 213 and the second neck 214 in the radial direction is smaller than a width W32 of the enveloping member 32 in the radial direction. The width W213, W214 of each of the first neck 213 and the second neck 214 in the radial direction is smaller than a width W31 of the lid 31 in the radial direction.

A first protrusion 321 protrudes from the first side of the enveloping member 32 adjacent to the first side 311 of the lid 31 and is received in the first groove 314. A second protrusion 322 protrudes from the second side of the enveloping member 32 adjacent to the second side 312 of the lid 31 and is received in the second groove 315. At least one third protrusion 323 protrudes from a side of the enveloping member 32 adjacent to the outer periphery 313 of the lid 31. The at least one third protrusion 323 is received in the at least one third groove 316. The at least one third protrusion 323 is connected to the first protrusion 321 and the second protrusion 322.

In this embodiment, the at least one third groove 316 includes six third grooves 316 equispacedly disposed in the outer periphery 313 of the lid 31. The six third grooves 316 are intercommunicated with the first groove 314 and the second groove 315. An end of each of the six third grooves 316 extends to the first side 311 of the lid 31. The other end of each of the six third grooves 316 extends to the second side 312 of the lid 31. In this embodiment, the at least one third protrusion 323 includes six third protrusions 323 respectively received in the six third grooves 316. Each of the six third protrusions 323 is connected to the first protrusion 321 and the second protrusion 322.

The electrolytic capacitor 10 having the above structure can effectively eliminate the gap between the lid 31 and the enveloping member 32. Even if the electrolytic capacitor 10 is in a frequently and vigorously vibrating environment, the coupling mechanism between the lid 31 and the enveloping member 32 can avoid generation of gaps between the lid 31 and the enveloping member 32 to avoid fluid leakage of the electrolytic capacitor 10, prolonging the service life of the electrolytic capacitor 10.

Figure 5:
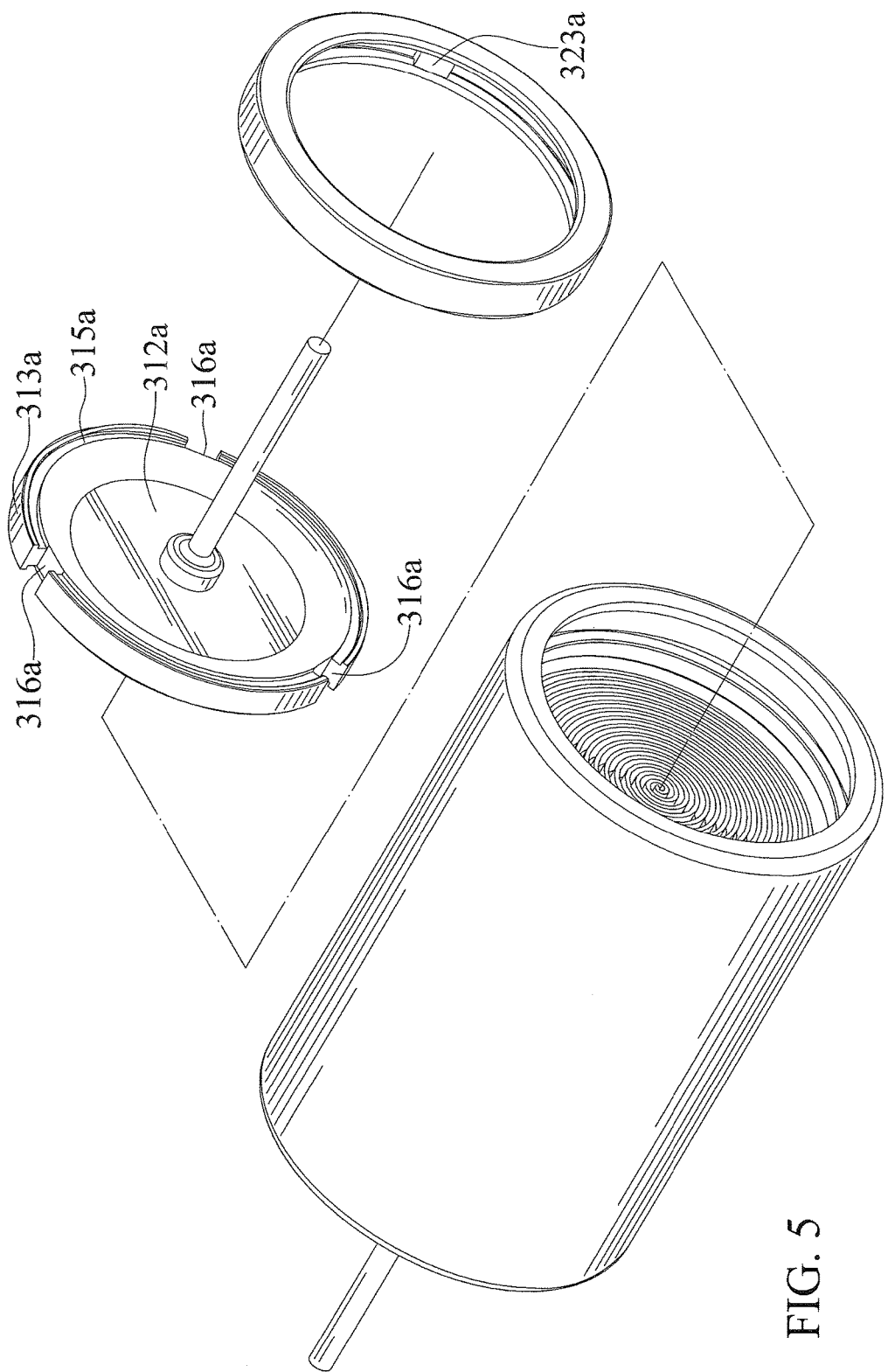
FIG. 5 is an exploded, perspective view of an electrolytic capacitor of a second embodiment according to the present invention.
Figure 6:
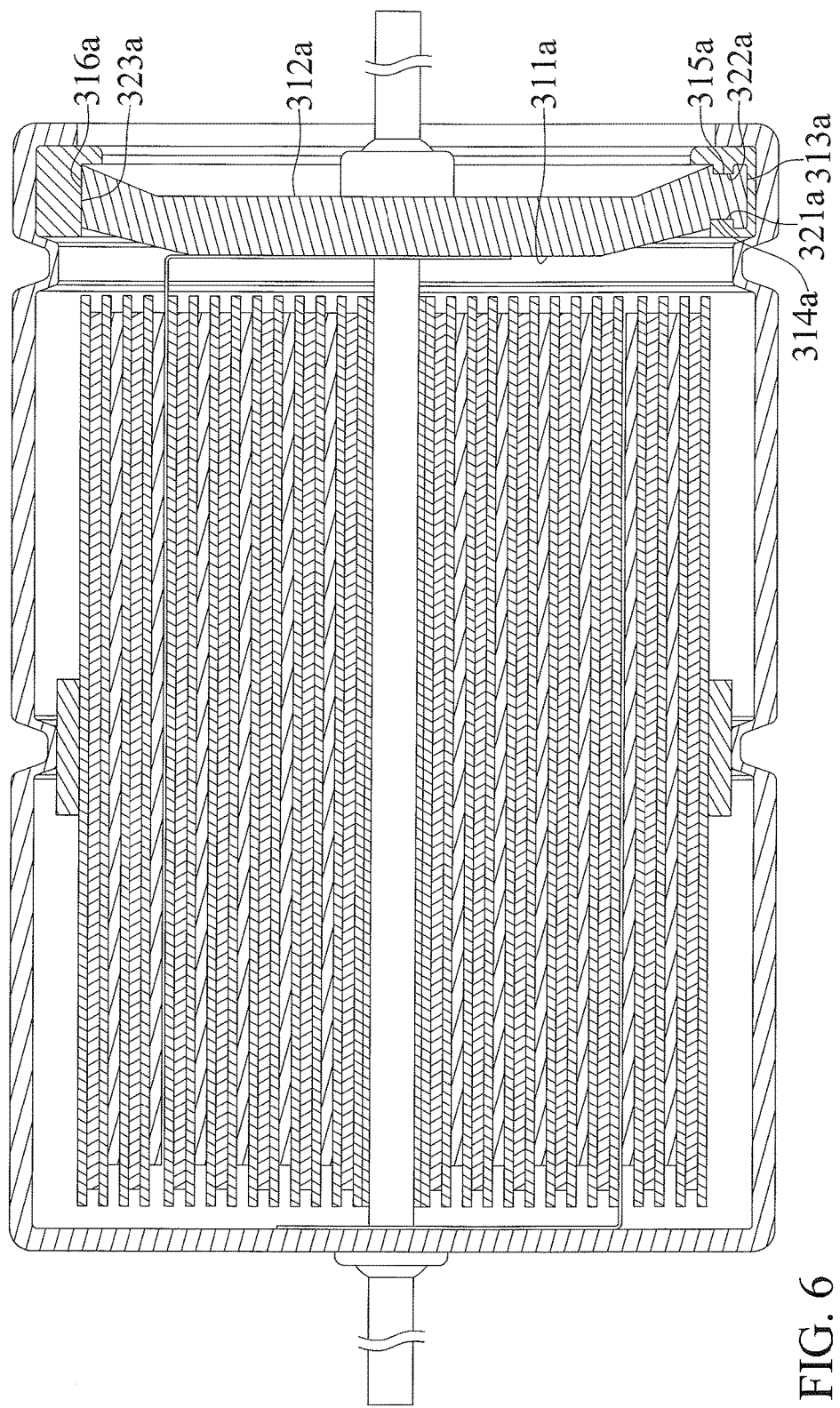
FIG. 6 is a cross sectional view of the electrolytic capacitor of FIG. 5.
Figure 7:
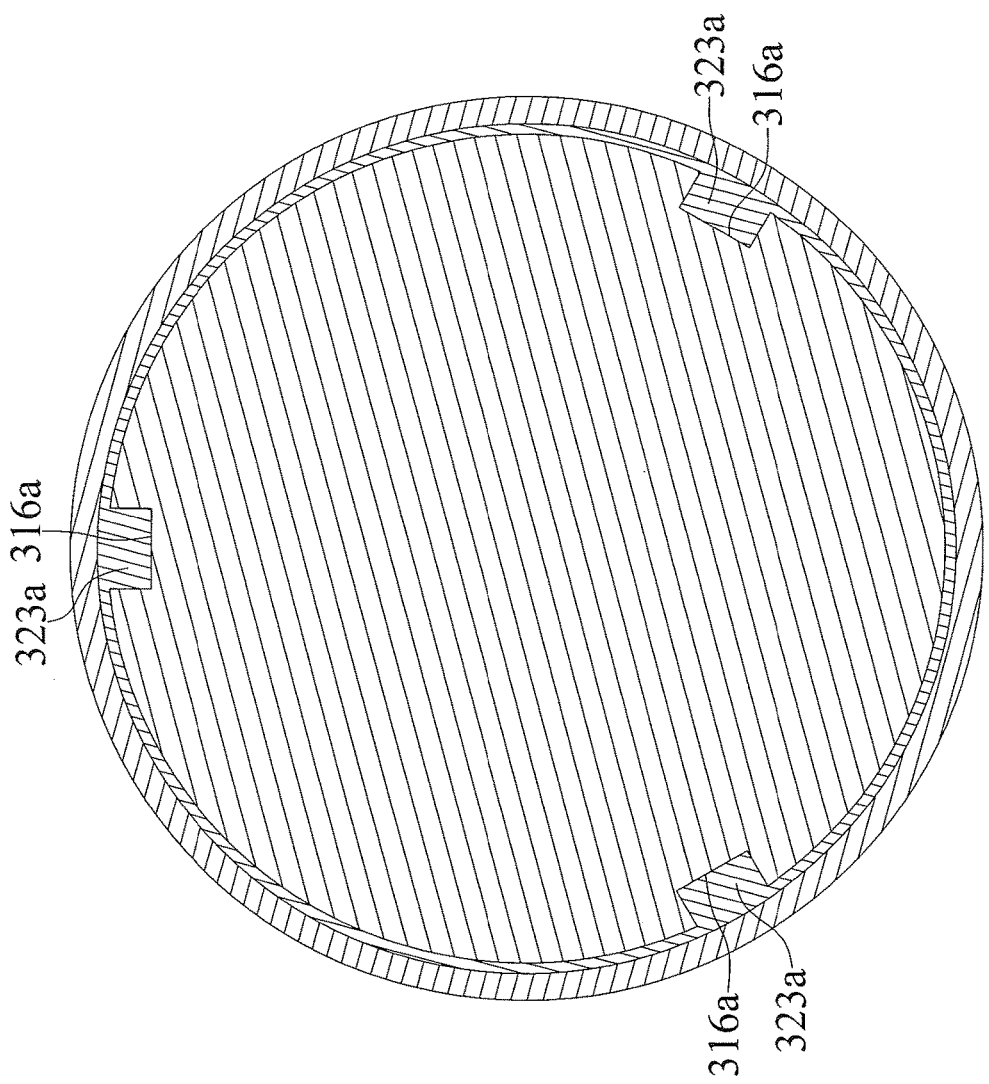
FIG. 7 is another cross sectional view of the electrolytic capacitor of FIG. 5.

FIGS. 5-7 show an electrolytic capacitor 10 of a second embodiment according to the present invention. The second embodiment is substantially the same as the first embodiment. The main difference between the second embodiment and the first embodiment is that the at least one third groove 316a includes three third grooves 316a equispacedly disposed in the outer periphery 313a of the lid 31a. The three third grooves 316a are intercommunicated with the first groove 314a and the second groove 315a. An end of each of the three third grooves 316a extends to the first side 311a of the lid 31a. The other end of each of the three third grooves 316a extends to the second side of 312a of the lid 31a. In the second embodiment, the at least one third protrusion 323a includes three third protrusions 323a respectively received in the three third grooves 316a. Each of the three third protrusions 323a is connected to the first protrusion 321a and the second protrusion 322a.

Although specific embodiments have been illustrated and described, numerous modifications and variations are still possible without departing from the scope of the invention. The scope of the invention is limited by the accompanying claims.

What is claimed is:

1. An electrolytic capacitor comprising:
a body including a casing and a capacitor core, wherein the casing includes a receiving space, wherein the casing further includes a side having an opening intercommunicated with the receiving space, and wherein the capacitor core is mounted in the receiving space; and
a sealing cover mounted in the opening of the body, wherein the sealing cover includes a lid and an enveloping member, wherein the lid includes a first side adjacent to the capacitor core and a second side opposite to the first side, wherein the lid further includes an outer periphery extending between the first side and the second side of the lid, wherein the enveloping member is securely engaged with the lid by insert molding, wherein the enveloping member is engaged with the first side, the second side, and the outer periphery of the lid, wherein the first side of the lid includes a first groove, wherein the second side of the lid includes a second groove, wherein a first protrusion protrudes from a first side of the enveloping member adjacent to the first side of the lid and is received in the first groove, and wherein a second protrusion protrudes from a second side of the enveloping member adjacent to the second side of the lid and is received in the second groove.

2. The electrolytic capacitor as claimed in claim 1, wherein the lid includes at least one third groove defined in the outer periphery, wherein the at least one third groove intercommunicates with the first groove and the second groove, wherein at least one third protrusion protrudes from a side of the enveloping member adjacent to the outer periphery of the lid, wherein the at least one third protrusion is received in the at least one third groove, and wherein the at least one third protrusion is connected to the first protrusion and the second protrusion.

3. The electrolytic capacitor as claimed in claim 2, wherein the at least one third groove includes an end extending to the first side of the lid, and wherein the at least one third groove further includes another end extending to the second side of the lid.

4. The electrolytic capacitor as claimed in claim 2, wherein the first groove is annular and is adjacent to the outer periphery of the lid, wherein a spacing between the first groove and the outer periphery in the radial direction is constant throughout a length of the first groove in a circumferential direction perpendicular to the radial direction, wherein the second groove is annular and is adjacent to the outer periphery of the lid, and a spacing between the second groove and the outer periphery of the lid in the radial direction is constant throughout a length of the second groove in the circumferential direction.

5. The electrolytic capacitor as claimed in claim 4, wherein the casing further includes a first neck and a second neck at the opening, wherein the sealing cover is located between the first neck and the second neck, wherein the first neck abuts the second side of the enveloping member, wherein the second neck abuts the first side of the enveloping member, wherein a width of each of the first neck and the second neck in the radial direction is smaller than a width of the enveloping member in the radial direction.

6. The electrolytic capacitor as claimed in claim 5, wherein the width of each of the first neck and the second neck in the radial direction is smaller than a width of the lid in the radial direction.

7. The electrolytic capacitor as claimed in claim 4, wherein the outer periphery of the lid is ring-shaped.

8. The electrolytic capacitor as claimed in claim 4, wherein the at least one third groove includes six third grooves equispacedly disposed in the outer periphery of the lid, wherein the six third grooves are intercommunicated with the first groove and the second groove, wherein an end of each of the six third grooves extends to the first side of the lid, wherein another end of each of the six third grooves extends to the second side of the lid, wherein the at least one third protrusion includes six third protrusions respectively received in the six third grooves, and wherein each of the six third protrusions is connected to the first protrusion and the second protrusion.

9. The electrolytic capacitor as claimed in claim 4, wherein the at least one third groove includes three third grooves equispacedly disposed in the outer periphery of the lid, wherein the three third grooves are intercommunicated with the first groove and the second groove, wherein an end of each of the three third grooves extends to the first side of the lid, wherein another end of each of the three third grooves extends to the second side of the lid, wherein the at least one third protrusion includes three third protrusions respectively received in the three third grooves, and wherein each of the three third protrusions is connected to the first protrusion and the second protrusion.

* * * * *